US007290143B2

(12) United States Patent
Renier et al.

(10) Patent No.: US 7,290,143 B2
(45) Date of Patent: Oct. 30, 2007

(54) METHOD OF CERTIFYING TRANSMISSION, RECEPTION AND AUTHENTICITY OF ELECTRONIC DOCUMENTS AND RELATED NETWORK UNIT

(75) Inventors: Frederico Renier, Mestre (IT); Pierluigi Virgili, Mestre (IT)

(73) Assignee: KP Twelve SRL, Mestre (IT)

( * ) Notice: Subject to any disclaimer, the term of this patent is extended or adjusted under 35 U.S.C. 154(b) by 672 days.

(21) Appl. No.: 10/450,314

(22) PCT Filed: Dec. 10, 2001

(86) PCT No.: PCT/EP01/14441

§ 371 (c)(1),
(2), (4) Date: Nov. 3, 2003

(87) PCT Pub. No.: WO02/49309

PCT Pub. Date: Jun. 20, 2002

(65) Prior Publication Data

US 2004/0083365 A1    Apr. 29, 2004

(30) Foreign Application Priority Data

Dec. 12, 2000  (IT)  ............................ VI2000A0274

(51) Int. Cl.
*H04L 9/00* (2006.01)
*H04K 1/00* (2006.01)
*G06F 11/30* (2006.01)
*G06F 12/14* (2006.01)
*G06F 7/04* (2006.01)
*G06F 17/30* (2006.01)
*H04L 9/32* (2006.01)
*G06K 9/00* (2006.01)

(52) U.S. Cl. .................. 713/175; 713/168; 713/169; 713/170; 713/171; 713/176; 713/189; 713/190; 713/191; 726/26; 726/27; 726/28; 726/29; 726/30; 705/400

(58) Field of Classification Search .................. None
See application file for complete search history.

(56) References Cited

U.S. PATENT DOCUMENTS 6,181,781 B1 * 1/2001 Porter et al. ............. 379/88.17

(Continued)

FOREIGN PATENT DOCUMENTS

WO    WO98/17042       4/1998
WO    WO 98/17042  *  4/1998

(Continued)

*Primary Examiner*—Christopher Revak
*Assistant Examiner*—Longbit Chai
(74) *Attorney, Agent, or Firm*—Michael Best & Friedrich LLP

(57) ABSTRACT

A method of certifying transmission, reception and authenticity of electronic documents between a sender user (2) and addressee user (3) belonging to a telecommunication network (4) is disclosed, wherein the sender (2) carries out the following steps: drafting the document to be sent putting the electronic address of addressee (3), sending to a mailbox belonging to the telecommunication network associated to the addressee (3) a message comprising the drafted documents and wherein the addressee (3) carries out the step of downloading the message from the mailbox associated to him. The method provides for the automatic generation of a certificate of transmittal of the message that is being automatically sent to the mailbox of the sender (2) by a certification entity connected to the network when the message reaches the mailbox of the addressee (3).

21 Claims, 4 Drawing Sheets

U.S. PATENT DOCUMENTS

| | | | |
|---|---|---|---|
| 6,199,054 B1 * | 3/2001 | Khan et al. | 705/400 |
| 6,301,488 B1 * | 10/2001 | Alos et al. | 455/557 |
| 6,816,274 B1 * | 11/2004 | Silverbrook et al. | 358/1.15 |
| 7,076,730 B1 * | 7/2006 | Baker | 715/526 |

FOREIGN PATENT DOCUMENTS

| | | |
|---|---|---|
| WO | WO99/21330 | 4/1999 |
| WO | WO01/10090 | 2/2001 |

* cited by examiner

METHOD OF CERTIFYING TRANSMISSION, RECEPTION AND AUTHENTICITY OF ELECTRONIC DOCUMENTS AND RELATED NETWORK UNIT

The present invention relates to a method of certifying transmission, reception and authenticity of electronic documents to be useD as an alternative to postal services delivering normal letters, printed matter, registered letters, insured letters and to electronic mail as well as a network unit adapted to carry out such a method.

It is well known that the development of information systems led the companies to develop internal telecommunications networks called INTRANET, consisting of a plurality of interconnected computers capable of communicating with each other.

In the sixties a global network was also developed called INTERNET that can be defined as a telecommunication network of telecommunication networks and having its extension as main feature.

More particularly the internet network is developed on the whole earth surface and allows anybody having a computer to connect with the network and use the services offered.

More particularly one of the services offered by internet is the electronic mail allowing to send and receive messages, electronic documents, images and anything else to anybody being a member of the network.

More particularly the system provides that both sender and addressee of the electronic message as members of the network, are each provided with at least an e-mail address and a computer having the means required for sending and receiving electronic documents through the net.

It is known that the sender prepares the electronic document containing the information to be sent, and sends it to the addressee giving to the message his address.

The sent message travels on the intranet or internet network passing from one server to the other until it reaches the server having the mailbox associated to the addressee.

The message contained in the mailbox reaches the addressee as soon as the latter connects to the net to check its contents. In this way indeed the addressee starts the procedure of transferring the electronic document to his computer so as to allow its reading.

A first drawback of the described electronic mail system consists in that it doesn't guarantee identity of the sender.

More particularly the system is not able to warrant that the message drafter is actually the person identified by the sender's electronic mail address.

A further drawback linked to the preceding one, consists in that the electronic documents sent and received with such a system do not have a legal validity. This makes necessary using the system of paper mail when a legal validity of the document is required.

In order to overcome said drawbacks the prior art provides for use of the digital signature being the computerized equivalent of the handwritten signature set on the paper documents.

Such a signature is supported by special rules stating that anybody intends to draft and sign computerized documents with legal validity, must obtain the above mentioned digital signature.

More particularly this signature has the same legal validity and identifies in an univocal way, the person who set his signature warranting also that the document received was not altered after signature.

More particularly the digital signature is based on the symmetric cryptography and provides for use of a couple of keys, a private key secretly kept by the holder, and a public key necessary for the addressee to verify authenticity of the signature set by the sender.

As it is known, the two keys consist of a set of only apparently random characters and are interrelated in an univocal way so as to make impossible to go back from the public key to the private key.

The univocal association between public key and the holder of the corresponding private key is warranted by proper certification entities authorized to release and keep said keys.

It is known that the cryptography algorithm is based on the Hash algorithm extracting from the document an imprint constituting a univocal synthesis from which it is not possible to go back to the original document and to which a codification algorithm is subsequently applied using the private key of the user. This method allows to decode the document to be sent in order to warrant that said document is being read only and exclusively by the intended addressee.

A first drawback of the above described system consists in that it allows to warrant integrity of the sent message and sender's identity but does not warrant the sender that transmittal and delivery of the message to the addressee occurred.

Another drawback consists in that the sender does not know the date and time of the delivery nor the date of opening the document transmitted by him.

The object of the present invention is to overcome the foregoing drawbacks.

More particularly a first object of the invention is to provide a method certifying that the message was sent to the addressee.

Another object of the invention is to provide a method certifying that the addressee read the electronic document sent by the sender.

Another object of the invention is to provide a method allowing transmittal and reception of documents having a legal validity and provided with a transmittal and reception, fixed date.

A further object is to propose a method warranting delivery speed and flexibility of the electronic mail system combined with the legal validity of the documents so transmitted.

A last but not least object is to provide a network unit to be connected in said net to carry out the method of the present invention.

The foregoing objects are attained by a method for certifying transmission, reception and authenticity of electronic documents between at least a sender user and at least an addressee user belonging to a telecommunication network wherein according to the main claim, said sender user carries out the following steps:

drafting the document to be sent setting the electronic address of said addressee user;

encrypting said document to be sent;

codifying said encrypted document through a private key;

sending to a mailbox belonging to said telecommunication network associated with said addressee user, a message comprising said drafted document, said encrypted and codified document and a public key for decoding said codified and encrypted document;

and wherein said addressee user carries out the following steps:

downloading said message from said mailbox assigned to him; decoding said encrypted and codified document through said public key;

encrypting said document drafted by said sender;

comparing said encrypted document with said decoded document to verify authenticity of said received document;

said method being characterized by providing the automatic generation of a message transmittal certificate which is automatically sent to the mailbox of said sender user from a certification entity connected to the net, when said message reaches said mailbox of said addressee.

Advantageously the proposed method allows to check the quantity of information transmitted by the sender in order to charge him the cost of the transmission.

Still advantageously the proposed method allows to charge in an automatic and periodical way the costs relating to the transmissions effected by each sender.

The foregoing method is carried out through a network unit operating as certification entity comprising:

connection means to said telecommunication network;

message reception and transmission means, from and to said telecommunication network;

at least a first file unit containing the data of said users and at least an identification code for each of said users;

processing means for the messages received as input from said transmission and reception means identifying the sender of said messages and checking if said sender is included among the users existing in said at least one file unit so as to admit or refuse said messages;

at least a second file unit containing the admitted messages; and certification means adapted to create certification documents of the transmittal and/or reception of said messages to one or more addressees.

The foregoing objects and advantages will be better understood by reading the following description of a preferred embodiment with reference to the accompanying sheets of drawings in which.

Figure 1:
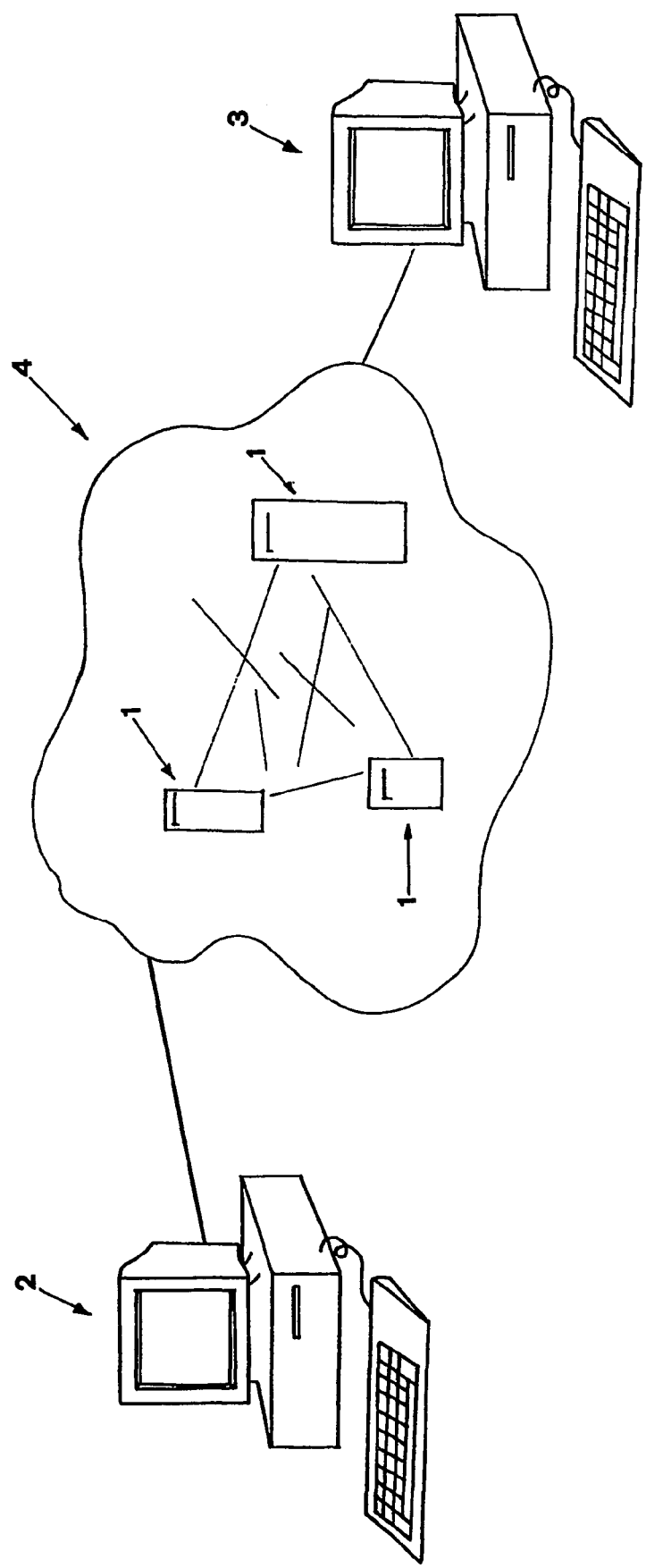
FIG. 1 is the basic scheme of the telecommunication network to which each sender and addressee are connected.
Figure 2:
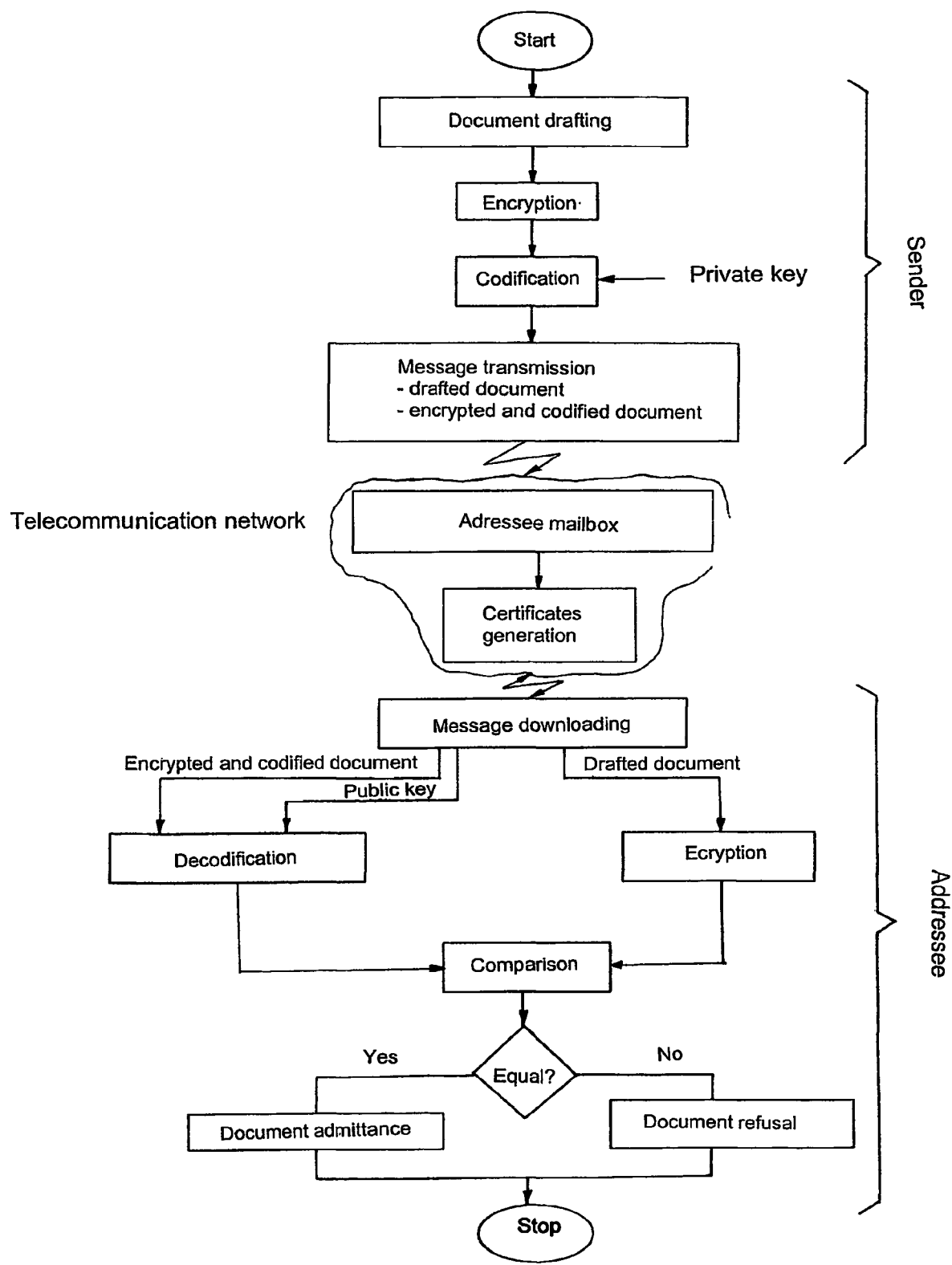
FIG. 2 is a block diagram showing the method of the present invention.

The method of certifying transmission, reception and authenticity of electronic documents between a sender user 2 and an addressee user 3 belonging to a telecommunication network 4 of the present invention provides that as shown in FIGS. 1 and 2, the sender user 2 drafts the document to be sent putting the electronic address of the addressee user and encrypts the document with subsequent codification through a private key in his possession. Finally he sends to the mailbox associated to the addressee 3 and belonging to the telecommunication network 4, a message comprising the drafted document, the encrypted and codified document and a public key allowing the decodification of the codified and encrypted document.

The addressee user in his turn downloads the message from the mailbox, decodes the encrypted and codified document through the public key and encrypts the document drafted by the sender.

Finally he compares the encrypted document with the decoded document to check authenticity of the received document.

The invention provides for the automatic generation of a message transmittal certificate which is being automatically sent to the mailbox associated with the sender, also belonging to the telecommunication network, when the message reaches the addressee mailbox.

More particularly said certificate is generated and sent by a certification entity intended for this service and connected to the net.

The invention provides that when the addressee gains access to his mailbox to check its contents and download any message, a certificate of occurred delivery of the message is automatically generated and automatically sent to the mailbox of the sender.

Still according to the invention the addressee when opening the message may send to the sender in a manual or automatic way, a certificate of having read the document sent by the sender informing the latter that the message was actually read.

The method of the invention provides also that at each message exchanged between the user a weight is assigned being a function of the size and type of message, by which cost of transmission to be charged to the sender and or the addressee is calculated.

Figure 3:
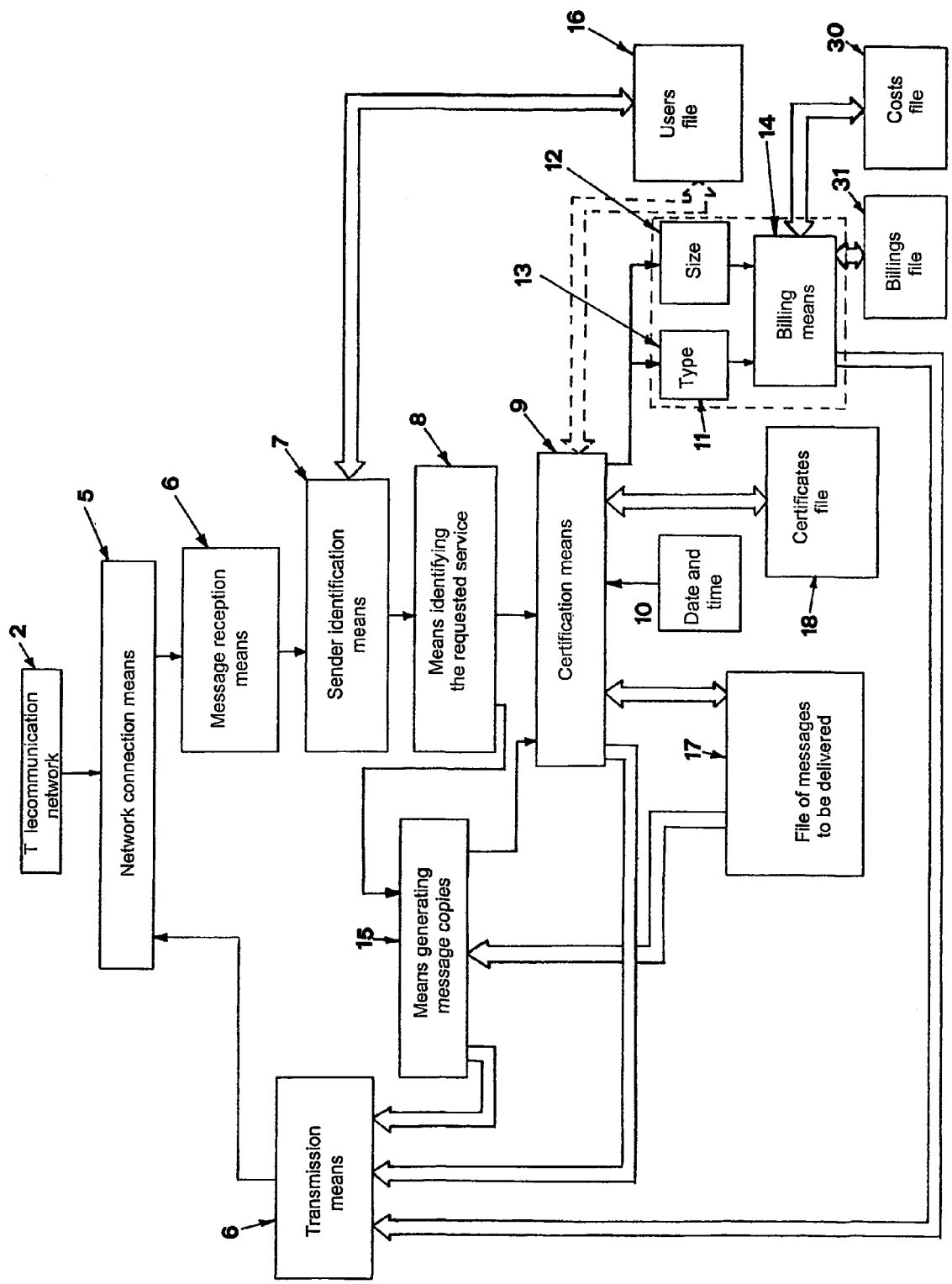
FIG. 3 is a block diagram of the network unit of the invention adapted to carry out the method shown in FIG. 2.

The method of the invention is carried out as shown in FIG. 1, by connecting to the telecommunication network 2 one or more network units 1 with the function of certification entity provided as shown in the block diagram of FIG. 3, with connection means 5 to said network 4, cooperating with message transmission and reception means 6 to send or receive the messages in the network 2 and mailboxes associated to the users.

More particularly the network unit 1 comprises:

identification means 7 of the message sender adapted to admit or refuse the messages received by the network;

identification means 8 of the kind of requested service;

certification means 9 adapted to generate documents certifying transmittal and/or reception of messages exchanged by user 2, 3 cooperating with means. 10 adapted to supply the fixed time and date of reception or transmission of the message or the generated certificate;

computation means 11 of the message transmittal cost comprising means 12 for measuring size of the messages, cooperating with identification means 13 of the requested service and automatic charging means 14 to the users;

means 15 generating a copy of the message sent by the sender and of the generated certificates;

a first non erasable file unit 16 containing for each user of the service a personal identification code and any personal data;

a second non erasable file unit 17 containing the messages admitted by the corresponding means;

a third non erasable file unit 18 containing the certificates generated by the corresponding means;

and a fourth file unit containing the invoices.

The network unit 1 may also comprise encryption and decryption means for the messages sent or received by the network necessary to warrant privacy of transmittal, of a type known per se and therefore not described hereinafter.

Figure 4:
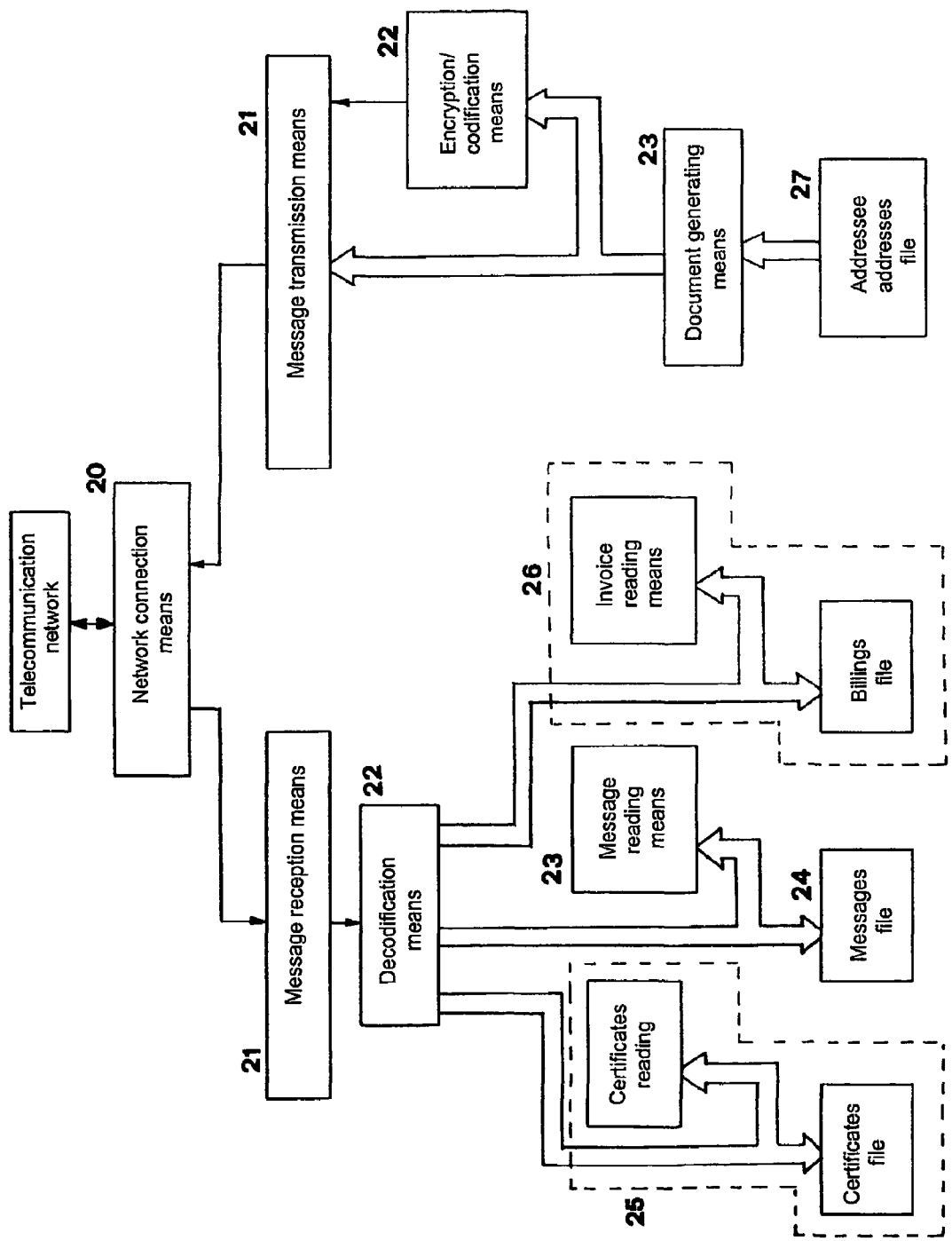
FIG. 4 is a block diagram of some elements belonging to the computer of each user provider of the mail service of the invention.

As to the users of the service, they are connected to the telecommunication network as diagrammatically shown in FIGS. 1 and 4 through a computer.

More particularly the computer comprises: connection means 20 to the network 4;

message transmission and reception means 21;

encryption and decryption means 22 and codification and decodification means 22;

means 23 for generating and reading documents and messages;
a file 24 of received and sent messages;
means 25 for filing and reading certificates;
means 26 for filing and reading invoices;
an addressee file 27.

With regard to the certification document of the document transmittal and the certificate of delivery according to the invention, each of them comprises the identification code of the network unit that received the message and sent the certification document, a declaration of certification of sender's or addressee's identity and the date of reception by the server of the document sent by the sender.

As to the document certifying reading of the message, it comprises the identification code of the addressee who read the message accompanied by a declaration certifying that reading occurred as well as the date of said reading by the addressee.

As to the steps of codification or decodification and encryption and decryption of the documents that could even not be used, they are preferably based on methods of asymmetric cryptography.

As above mentioned said methods provide for using a private key and a public key supplied by a certification entity of the identity of the holder of said keys, identifying univocally the user holder.

The sender user who wants operatively to send a message, uses the document reading and writing means 23 with which his computer is provided and proceeds to encrypt and codify the document following the previously described method, putting the electronic address of the addressee taken from the addressee file 27.

Then he sends to the net the message that is collected by the reception means 6 belonging to the network unit 1 having the mailbox associated with the addressee 3.

The identification means 7 then provide to identify the sender and check that he belongs to the file unit 16 of the service users.

If the sender is not found in the file 16, the message is refused, otherwise it goes to the identification means 8 of the requested service detecting the type of requested service and deciding the subsequent steps to be carried out.

More particularly the identification means 8 recognize whether it is a check of the contents of a mailbox or it is a transmission of a message that must occur with a receipt proving transmittal or delivery or reading occurred.

In the case in question it is a transmission request and therefore the means 9 generating certificates are activated.

These means 9 generate the requested certificate requesting date and time of receipt of the message to the corresponding means 10 and file both the received message and the generated certificate.

At the same time the billing means 11 are activated that charge the cost to the sender 2 according to the size and type of requested service on the base of a schedule of costs contained in a cost file unit 30. More particularly the invoice is filed in a corresponding file unit 31 and possibly sent at the same time to the sender 2.

The certificate so generated is then sent through the transmission means 6 to the mailbox of sender 2 who may or may not belong to the network unit 1 generating said certificate, while the message is deposited in the mailbox of the addressee 3 consisting of the cell of the file 17 of documents to be delivered.

The sender 2 connecting to the net and checking his mailbox may then download a copy of the transmittal certificate that will be filed in the corresponding file 25 with which his computer is provided. Such a certificate gives him the warrant under responsibility of the entity carrier of the network unit 1, that the transmittal of the message to addressee 3 occurred, thus attaining the intended objects.

The addressee 3 intending to download the mail contained in his mailbox, sends such a request to the network unit 1 that once identified both the user and type of requested service, proceeds to activation of the means 15 generating copy of the messages to be delivered downloaded on the computer of addressee 3 as well as activation of the certificate generating means.

These means 15 activate the certification means 9 generating a certificate of delivery to addressee 3 of the message sent by sender 2 in a similar way to the preceding one.

Such a certificate is then sent to the mailbox associated to sender 2 that can therefore download it receiving the warrant under the responsibility of the entity carrier of the network unit 1, that the message was duly delivered to addressees so as to reach the intended objects.

It is important to note that the carrier of the network unit 1 is warranter of all the operations of delivery and custody of the messages that as above stated, are contained in a nonerasable file unit.

Such a system thus allows to give legal validity and certitude of occurred transmittal and delivery also to the messages sent using a telecommunication mail system.

According to a non illustrated executive version, the network unit 1 may comprise means for sending SMS messages to a cellular phone belonging to the addressee, said messages being automatically activated to advice him of arrival of a new message or the status of his mailbox.

Alternatively the network unit 1 may supply such a service through means for sending voice messages that could then reach not only mobile telephone sets but also fixed telephone sets.

All the means constituting the network unit may be indifferently formed by microprocessor units, electronic devices of any kind or the operative system of a computer.

Moreover all the filing units may consist of backing storage units such as hard disks or CDROM unit or magnetic support in general.

Moreover the certification entity of the identity of user, sender and addressee, supplying the public and private keys and the certification entity of transmittal and delivery may indifferently consist of a single entity or several different entities.

In the implementing phase, many modifications could be made to the method and to the network unit; that when falling within the scope of the appended claims should be considered covered by the present patent.

The invention claimed is:

1. A method of certifying transmission, reception and authenticity of electronic documents between at least one sender user and at least one addressee user in a telecommunication network, the method comprising:
   wherein the sender user carries out the following steps:
      drafting the document to be sent,
      sending a message comprising the drafted document to a mailbox associated with the addressee user through the telecommunication network,
   wherein the addressee user carries out the following step:
      downloading the message from the mailbox associated with the addressee user, and
   the method further comprising:
      receiving the message from the sender user at a certification entity, identifying by the certification entity the sender user from whom the message is received, checking at the certification entity if the sender user is a certified sender user included among sender and addressee users comprised in at least one file unit so as to admit or refuse the message, wherein a transmittal certificate is automatically generated and sent to a mailbox associated to the sender user by a certification entity connected to the telecommunication network when the message reaches the mailbox of the addressee user, if the identified sender user is included among the sender and addressee users in the file unit of the certification entity, and providing by the addressee user to the sender user one of a manual and automatic transmission of a certificate of having read the message, when the addressee user opens the message.

2. The method according to claim 1, wherein checking if the sender user is a certified sender user included among sender and addressee users includes checking, if an identification code of the sender user is comprised in the at least one file unit.

3. The method according to claim 1, wherein the sender user further carries out the following steps:

encrypting the document to be sent, and codifying the encrypted document using a private key of the sender user, wherein the message further comprises:

the document having been encrypted and codified, and a public key of the sender user, wherein the public key is associated to the private key of the sender user, and wherein the addressee user further carries out the following step:

decrypting the document having been codified using the private key of the sender user by using the public key of the sender user.

4. The method according to claim 1, wherein providing the automatic generation of a delivery certificate that is automatically sent to the mailbox of the sender user when the addressee user gains access to the mailbox associated to him.

5. The method according to claim 1, further comprising the following steps:

checking size of the document, calculating costs of the transmittal of the message, and billing the calculated costs to one of the sender user and the addressee user.

6. The method according to claim 1, wherein a private key and a public key are supplied by a certification entity of the identity of the sender and addressee users, the keys identifying univocally the sender and addressee users.

7. The method according to claim 1, wherein encryption and decryption operation of the document are based on a method of asymmetric cryptography.

8. A network unit operable to carry out the method of claim 1, the network unit operating as a certification entity, the network unit comprising:

connection means for connecting to a telecommunication network;

reception and transmission means for receiving and transmitting messages from and to the telecommunication network;

a first file unit including data of sender and addressee users, wherein the first file unit includes at least an identification code for each of the sender and addressee users;

encryption and decryption means for encrypting and decrypting the messages sent and received by the reception and transmission means;

identification means for identifying the sender user of a message received as input from the reception and transmission means and for checking, if the sender user is a certified sender user included among the sender and addressee users comprised in the first file unit so as to admit or refuse the message;

a second file unit including the admitted messages; and certification means adapted to generate a certification document of one of transmittal and reception of the messages to one or more addressee users, if the sender user is included among the sender and addressee users.

9. The network unit according to claim 8, further comprising an electronic mailbox associated with the sender and addressee users.

10. The network unit according to claim 8, further comprising means for calculating costs of transmittal of a message to be charged to one of the sender user and the addressee user.

11. The network unit according to claim 8, further comprising automatic billing means for billing the cost of transmitting a message to one of the sender user and the addressee user.

12. The network unit according to claim 8, further comprising means for supplying a fixed time and date of reception of the message and transmission of the certificate upon request of the certification means.

13. The network unit according to claim 8, further comprising a third file unit including the certificates.

14. The network unit according to claim 8, wherein the first file unit of the sent documents is non-erasable.

15. The network unit according to claim 8, wherein the third file unit of the certificates is non-erasable.

16. The network unit according to claim 8, further comprising means for generating a copy of a message sent by the sender user.

17. The network unit according to claim 8, wherein the means for calculating the costs of transmittal of a message further comprises means for measuring a size of the message and for cooperating with the means for identifying the requested service, and further comprising a fourth file unit including invoices.

18. The network unit according to claim 8, further comprising means for sending SMS messages to a cellular phone of the addressee user that are automatically activated to advise the addressee user of the status of his electronic mailbox.

19. The network unit according to claim 8, further comprising means for sending voice messages to a telephone set of the addressee user that are automatically activated to advise the addressee user of the contents of his electronic mailbox.

20. A computer operable to carry out the method of claim 1, the computer comprising:

connection means to a telecommunication network cooperating with transmission and reception means of a message; and encryption and decryption means of the messages sent or received by the transmission and reception means.

21. The computer according to claim 20, further comprising means for handling and filing the certificates received by the certification entity.

* * * * *